Mar. 13, 1923.
J. RAVEN
1,448,638
RATCHET DRILL
Filed Apr. 12, 1920
2 sheets-sheet 1
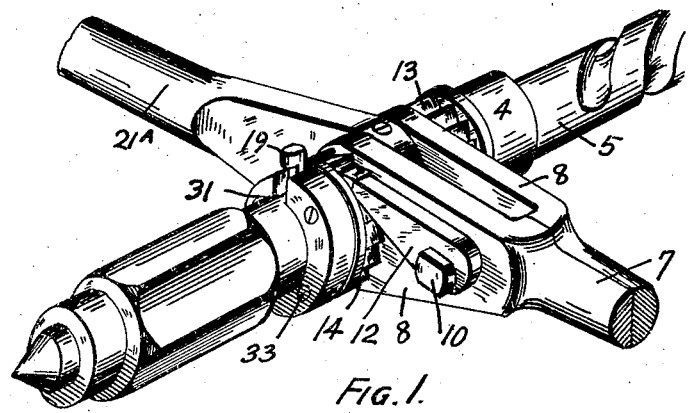
Fig. 1.
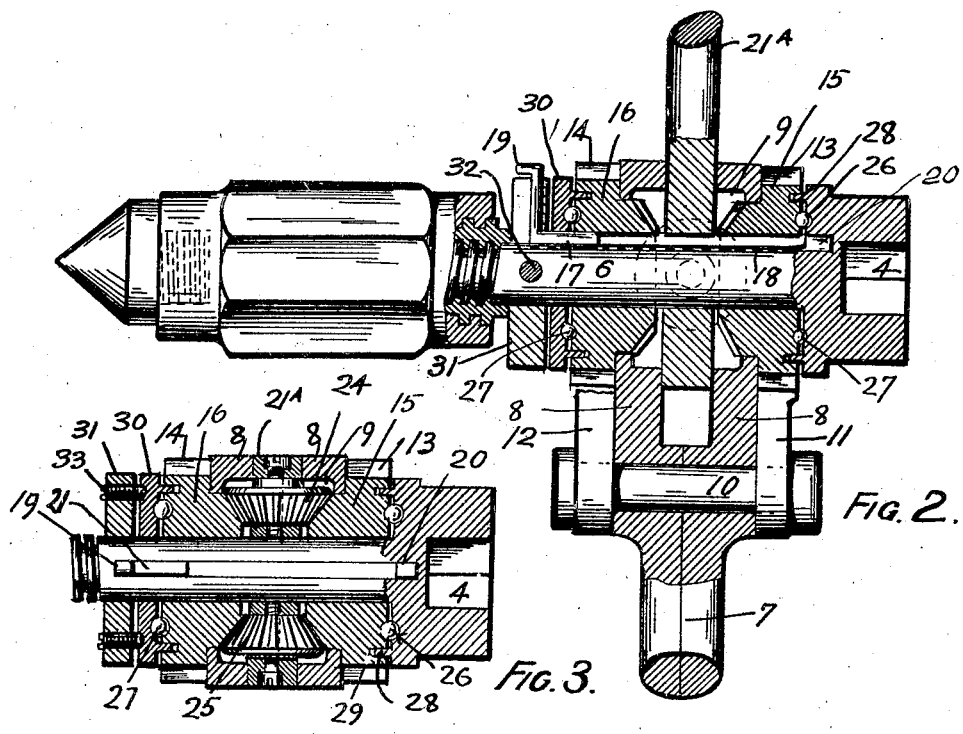
Inventor
John Raven
by
*Attorney*

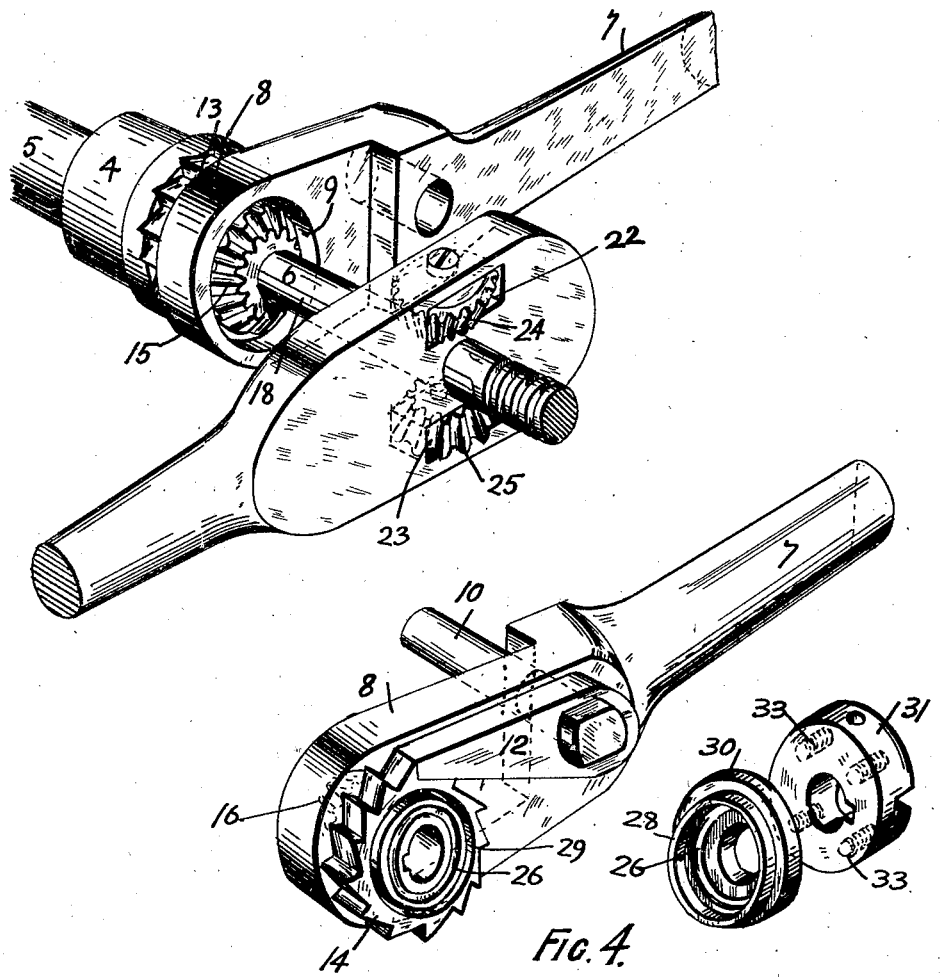

Patented Mar. 13, 1923.

1,448,638

UNITED STATES PATENT OFFICE.

JOHN RAVEN, OF DEERVALE, VIA ARMIDALE, NEW SOUTH WALES, AUSTRALIA.

RATCHET DRILL.

Application filed April 12, 1920. Serial No. 373,253.

*To all whom it may concern:*

Be it known that I, JOHN RAVEN, a subject of the King of Great Britain, residing at Deervale, via Armidale, in the State of New South Wales, Commonwealth of Australia, have invented certain new and useful Improvements in Ratchet Drills, of which the following is a specification.

This invention relates to improvements in ratchet drills of the type described in Patent No. 869,087 of October 22, 1907, assigned to me and especially to details whereby the construction is simplified and friction reduced to a minimum.

In the drawings herewith,

Figure 1 is a perspective view of a ratchet drill according to the invention.

Figure 2 is a partial central section, and

Figure 3, a central section at right angles to Figure 2.

Figure 4 is a perspective view showing several of the parts arranged in the order of their assembly.

4 represents the stock or socket for the drill 5, and 6 the spindle. 7 represents a reciprocable hand operating lever which is divided centrally throughout it length to simplify manufacture and facilitate assembly with the other parts as shown in Figures 1, 2 and 4, each half having an arm 8, recessed at 9. The free end of the lever 7 is provided with a tight fitting ring, clip or other simple retaining detachable device (not shown) to further hold the halves of the lever together when in position. The bolt 10 passes through the halves of the lever 7 and carries on opposite sides the spring pawls 11 and 12 which are adapted to engage the opposite ratchets 13 and 14 respectively formed on the bevel wheels 15 and 16. The key 17 slides in a key way 18 and has an operating finger piece 19 and shoulders 20 and 21 adapted to lock or unlock one or other of the bevel wheels 15 or 16 to or from the spindle 6. The stationary or holding arm 21$^A$ is bored at its inner end to permit passage of the spindle and is slotted at 22 and 23 to receive the intermediate bevel pinions 24 and 25 which are held therein so as to rotate freely in the recesses 9 and engage with the bevel wheels 15 and 16.

A cover plate 30 is provided for the bevel wheel 16, which cover plate is held in position by a collar or nut 31 mounted on the spindle 6 and secured to said spindle by a pin or set screw 32.

Balls 27 running in circular races or grooves 26 in the outer faces of the bevel wheels 15 and 16 and in complemental circular grooves in the adjacent faces of the stock 4 and cover plate 30 serve to minimize friction between the bevel wheel 15 and stock 4 and between the bevel wheel 16 and cover plate 30.

The stock 4 and cover plate 30 have on their faces, which lie adjacent to the bevel wheels 15 and 16 respectively, circular lips 28 surrounding the ball races 26. These lips 28, when the parts are assembled, enter complemental grooves 29 in the faces of the bevel wheels 15 and 16 with which the stock 4 and cover plate 30 are respectively associated and serve to exclude dust from the ball races 26.

Screws 33 extending through the collar or nut 31 engage the cover plate 30 and serve to secure an exact adjustment of the ball races 26 and balls 27.

It is obvious that the lips 28 might be formed on the bevel wheels 15 and 16 and that the complemental grooves 29 might be formed in the socket 4 and inner face of the cover plate 30.

I have illustrated and described in this application one practical embodiment of the invention but the construction shown and described is to be understood as illustrative only and not as defining the limits of this invention. It is my intention to include within the invention all such modifications and variations of structure which may fall within the scope of the appended claims.

Having thus described my invention, what I claim as new and desire to protect by Letters Patent is:—

1. In a ratchet drill, the combination with a spindle having an enlarged portion forming a socket, bevel wheels mounted on said spindle in spaced relation having oppositely disposed ratchets thereon, means for selectively locking either of said bevel wheels to the spindle, intermediate pinions meshing with said bevel wheels, a cover plate, a ball race on the outer face of one of said wheels and the adjacent end of said socket, a similar ball race on the other bevel wheel and the inner face of said cover plate, said bevel wheels having circular grooves in their outer faces and said socket and cover plate being each provided with a circular lip extending into said grooves and adapted to form in conjunction with said bevel wheels respectively, a housing for each of said ball races, and a collar secured to the spindle and provided with adjusting screws adapted to contact with said cover plate.

2. In a ratchet drill, the combination with a spindle, of bevel wheels mounted on said spindle in spaced relation having oppositely disposed ratchets thereon, a holding arm having an end formed with slots interposed between said wheels, pinions rotatably mounted on said arm, extending beyond said slots and meshing with said bevel wheels, an operating lever formed of two separable parts and having recesses at one end adapted to receive the slotted end and pinions of said holding arm, pawls carried by said operating lever for engaging said ratchets respectively, and means for selectively locking one or the other of said bevel wheels to the spindle.

In testimony whereof I have hereunto set my hand.

JOHN RAVEN.